United States Patent [19]

Hoshi

[11] Patent Number: 4,677,031
[45] Date of Patent: Jun. 30, 1987

[54] CONDUCTIVE PLATE
[75] Inventor: Toshiharu Hoshi, Hamamatsu, Japan
[73] Assignee: Nippon Gakki Seizo Kabushiki Kaisha, Japan
[21] Appl. No.: 847,736
[22] Filed: Apr. 3, 1986
[30] Foreign Application Priority Data Apr. 10, 1985 [JP] Japan .................................. 60-076191

[51] Int. Cl.⁴ ............................................ B32B 15/20
[52] U.S. Cl. ..................................... 428/610; 428/929
[58] Field of Search ............... 428/547, 610, 929; 148/39, 411, 412, 413, 414, 902; 419/6

[56] References Cited
U.S. PATENT DOCUMENTS

| | | | |
|---|---|---|---|
| 2,982,014 | 5/1961 | Meyer-Hartwig | 428/610 |
| 3,234,053 | 2/1966 | Pryor | 148/39 |
| 3,406,047 | 10/1968 | Magor et al. | 148/39 |
| 3,666,428 | 5/1972 | Haarbye | 428/547 |
| 3,741,734 | 6/1973 | Dunham | 428/547 |
| 3,802,851 | 4/1974 | Dunham | 148/39 |
| 3,941,570 | 3/1970 | Couchman | 428/548 |
| 4,222,749 | 9/1980 | Hijikata et al. | 148/39 |
| 4,326,899 | 4/1982 | Henricks | 148/39 |

OTHER PUBLICATIONS

Hausner, H. H., "Pressed-Powder Electrical Contacts Using Graded Multiple-Layers", Product Engineering, Sep. 1945, pp. 618–620.

Primary Examiner—L. Dewayne Rutledge
Assistant Examiner—John J. Zimmerman
Attorney, Agent, or Firm—Lerner, David, Littenberg, Krumholz & Mentlik

[57] ABSTRACT

In construction of a conductive plate made of dispersion strengthened copper alloy, the concentration of the dispersed substance is decreased in the surface sections in order to raise the bending endurance.

8 Claims, 10 Drawing Figures

CONDUCTIVE PLATE

BACKGROUND OF THE INVENTION

The present invention relates to a conductive plate, and more particularly relates to improvement in the state of dispersion in a conductive plate made of dispersion strengthened copper alloy.

A conductive plate of the above-described composition per se has been well known in the field of art. Such a conductive plate is used, for example, for a lead frame which requires high strength and high thermal conductivity.

In the construction of the conventional conductive plate of this sort, $Al_2O_3$ fine particles are almost uniformly dispersed in the thickness direction of the conductive plate. Further, $Al_2O_3$ is oriented in the form of fine threads in the direction of rolling or extrusion employed at production.

When such a conductive plate is used for production of lead frames, bending is applied in most cases to the conductive plate. Since $Al_2O_3$ is oriented in the form of fine threads, the conductive plate is vulnerable to bending along lines parallel to the direction of orientation. Such low resistance to bending allows easy generation of cracks in the surface section at bending and cracks are liable to cause total breakage of the conductive plate. In conclusion, the conventional conductive plate of this sort is quite unsuited for bending at production of various articles therefrom.

SUMMARY OF THE INVENTION

It is the object of the present invention to produce a conductive plate of dispersion strengthened copper alloy well suited for bending at production of various articles therefrom.

In accordance with the present invention the concentration of the dispersed substance is smaller in the surface section than in the core section.

DESCRIPTION OF THE PREFERRED EMBODIMENTS

As remarked above, the concentration of the dispersed substance is made different in the thickness direction of the conductive plate in accordance with the present invention. More specifically, the concentration of the dispersed substance is made smaller in the surface sections than in the core section in various modes. Several embodiments of such concentration distribution are shown in FIGS. 1 to 3, in which the concentration of the dispersed substance is taken on the ordinate and the thickness direction is taken on the abscissa.

Figures 1, 2, 3:
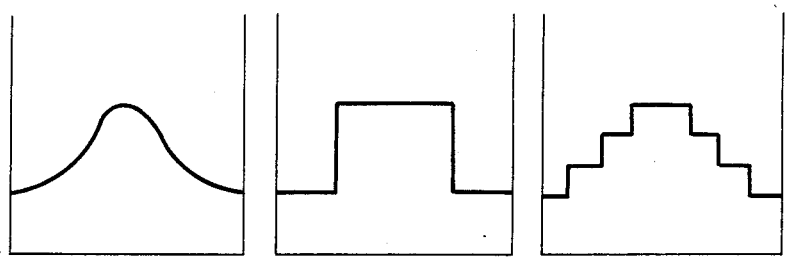
FIGS. 1 to 3 are graphs showing various states of dispersion in the conductive plate in accordance with the present invention.

In the mode shown in FIG. 1, the concentration increases gradually from one surface of the conductive plate, reaches the maximum value around the conductive plate and decreases gradually towards the other surface of the conductive plate like a normal distribution cause in statistics. The latter half of the total transition may differ in pattern from the former half. For example, when it is expected that bending will cause larger strain in the former half, the concentration in that region is made smaller than in the latter half. Accordingly, the concentration distributions of the respective surface sections in each half may also differ.

In the mode shown in FIG. 2, the concentration has discontinuous transitions whereas, in the mode shown in FIG. 3, the concentration has small stepwise transitions.

The concentration of the dispersed substance in the surface section should preferably be 90% or smaller than that in the core section. Further, the thickness of the lower concentration section, i.e. the surface section of each half, should preferably be 5% or larger, further preferably 10% or larger, of the total thickness of the conductive plate.

The term "surface section" herein used refers to a region in each half of the conductive plate of 5 to 45%, more preferably 10 to 45%, of the total thickness of the conductive plate.

The dispersed substance includes $Al_2O_3$, $SiO_2$, $TiO_2$, $ZrO_2$, $MgO$, $CaO$, $Y_2O_3$ and mixtures of some of them.

Figure 4:
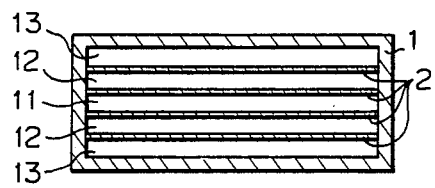
FIGS. 4 and 5 are sectional side and graphical views showing one example of production of the conductive plate in accordance with the present invention.
Figure 5:
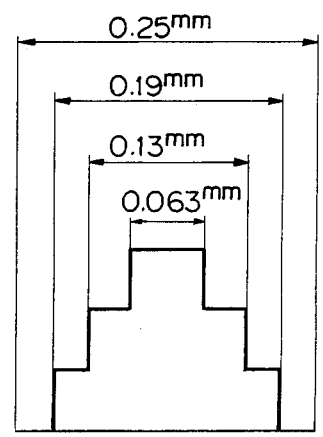

One example of production of the conductive plate in accordance with the present invention is shown in FIGS. 4 and 5. An angular tube 1 made of Cu is used for production as shown in FIG. 4 and the interior of the tube 1 is divided by partitions 2 in a size ratio shown in FIG. 5. The partitions 2 may be made of any material extractable outside after the packing described below. Most typically, paper, synthetic resin and metallic foils are usable. Next, the spaces defined by the partitions 2 are packed with the substance of the composition shown in Table 1 at about 60% degree of packing and the partitions 2 are extracted outside.

TABLE 1

| Substance | I | II | III |
|---|---|---|---|
| $Al_2O_3$ (Vol %) | 0.5 | 1.0 | 1.5 |
| Particle size (mesh) | −60 | | |
| Apparent density (g/cc) | 4.9 | 4.88 | 4.88 |

In the construction shown in FIG. 4, the substance III in Table 1 of the largest $Al_2O_3$ content is packed in the space 12, the substance II of the intermediate $Al_2O_3$ content is packed in the spaces 12, and the substance I of the smallest $Al_2O_3$ content is packed in the spaces 13.

The tube 1 is then sealed and placed in a vacuum chamber of $10^{-5}$ Torr. In this state the tube is subjected to hot extrusion at 900° C. The degree of reduction in surface area is, for example, from 50×200 down to 6×25. By subsequent, repeated cold rolling and annealing, a plate of 0.25 mm thickness is obtained.

EXAMPLES

Figure 6:
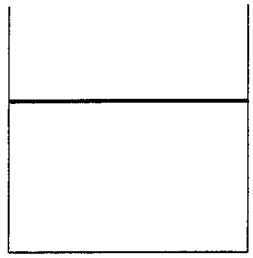
FIGS. 6 to 8 are graphs showing various states of dispersion in the samples used for the Examples, and FIGS. 9 and 10 explain the manner of the bending endurance test sampled to confirm the effect of the present invention.
Figure 7:
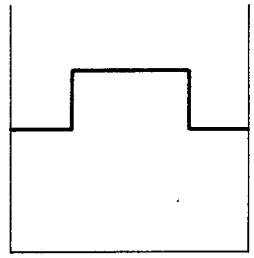
Figure 8:
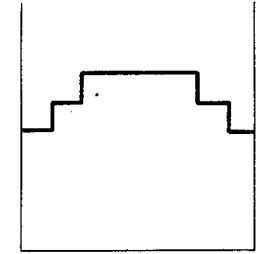
Figure 9:
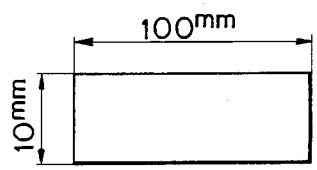
Figure 10:
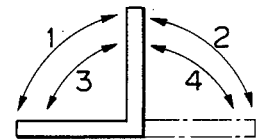

Conductive plates of the concentration modes shown in FIGS. 6 to 8 were used for formation of sample plates A, B, and C, respectively such as shown in FIG. 9. The sample plate A was a conventional one with uniform concentration in the thickness direction. The sample plate B had discontinuous concentration transitions whereas the sample plate C had small stepwise concentration transitions. Each sample plate was bent repeatedly as shown in FIG. 10 for measurement of tensile strength, conductivity and the maximum number of bending causing breakage. The results are given in Table 2.

TABLE 2

| Sample plate | A | B | C |
| --- | --- | --- | --- |
| Tensile strength (GPa) | | 0.55 | |
| Conductivity* (%) | 81 | 80 | 80 |
| Maximum number of bending | 2 | 4 | 8 |

*Ratio with respect to that of Cu.

It is clear from the results that, despite no significant difference in tensile strength and conductivity, the sample plates B and C in accordance with the present invention are much improved in bending endurance when compared with the conventional sample plate A.

What is claimed is:

1. A conductive plate having a core section and surface sections comprising dispersion strengthened copper alloy including a dispersed substance in which the concentration of the dispersed substance is smaller in the surface sections that in the core section.

2. A conductive plate as claimed in claim 1 in which said concentration of said dispersed substrate changes continuously.

3. A conductive plate as claimed in claim 1 in which said concentration of said dispersed substance changes discontinuously.

4. A conductive plate as claimed in claim 1 in which said concentration of said dispersed substance changes stepwise.

5. A conductive plate as claimed in claim 1 in which the concentration of said dispersed substance in said surface sections is 90% or smaller than that in said core section.

6. A conductive plate as claimed in claim 1 in which the thickness of the lower concentration section in each half of the conductive plate is 5% or larger of the total thickness of the conductive plate.

7. A conductive plate as claimed in claim 1 in which each of said surface sections is a region of 5 to 45% of the total thickness of the conductive plate.

8. A conductive plate as claimed in claim 1 in which said dispersed substance is chosen from a group consisting of $Al_2O_3$, $SiO_2$, $TiO_2$, $ZrO_2$, $MgO$, $CaO$, $Y_2O_3$ and mixtures of them.

* * * * *

UNITED STATES PATENT AND TRADEMARK OFFICE
CERTIFICATE OF CORRECTION

PATENT NO. : 4,677,031

DATED : June 30, 1987

INVENTOR(S) : Toshiharu Hoshi

It is certified that error appears in the above-identified patent and that said Letters Patent is hereby corrected as shown below:

Column 2, line 44, in Table 1, after the word "Particle" the entry "-60" should appear directly underneath both of the Columns headed "I" and "II".

Column 3, line 11, in Table 2, after the word "Tensile" the entry "0.55" should also appear directly under the Columns headed "A" and "C".

Column 4, line 2, "that" should read --than--.

Column 4, line 4, "substrate" should read --substance--.

Signed and Sealed this

Ninth Day of February, 1988

Attest:

DONALD J. QUIGG

*Attesting Officer*   *Commissioner of Patents and Trademarks*